(12) United States Patent
Aruga

(10) Patent No.: US 8,523,363 B2
(45) Date of Patent: Sep. 3, 2013

(54) PROJECTOR

(75) Inventor: Susumu Aruga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 325 days.

(21) Appl. No.: 12/897,343

(22) Filed: Oct. 4, 2010

(65) Prior Publication Data

US 2011/0085143 A1    Apr. 14, 2011

(30) Foreign Application Priority Data

Oct. 9, 2009  (JP) ................................. 2009-235242
Aug. 13, 2010  (JP) ................................. 2010-181294

(51) Int. Cl.
*G03B 21/28* (2006.01)
*H01K 1/30* (2006.01)

(52) U.S. Cl.
USPC ............................... 353/31; 353/99; 313/113

(58) Field of Classification Search
USPC ................. 353/31, 98, 99; 313/113
See application file for complete search history.

(56) References Cited

FOREIGN PATENT DOCUMENTS

| JP | A-2003-16802 | | 1/2003 |
| JP | 2005228711 A | * | 8/2005 |
| JP | 2007335196 A | * | 12/2007 |

* cited by examiner

*Primary Examiner* — Georgia Y Epps
*Assistant Examiner* — Magda Cruz
(74) *Attorney, Agent, or Firm* — Oliff & Berridge, PLC

(57) ABSTRACT

A projector includes: a light source that emits light having an asymmetric illuminance distribution; a light modulation device that modulates the light emitted from the light source; and an optical member disposed in an optical path between the light source and the light modulation device, the optical member changing the illuminance distribution of the light from the light source, wherein the optical member changes the illuminance distribution of the light passing therethrough in such a way that a highest illuminance area in the illuminance distribution of the light after passing through the optical member is shifted toward the center of the optical member as compared with the position of the highest illuminance area in the illuminance distribution of the light before incident on the optical member.

17 Claims, 6 Drawing Sheets

PROJECTOR

BACKGROUND

1. Technical Field

The present invention relates to a projector.

2. Related Art

As an apparatus capable of displaying an image for a large screen, there is a commercially available projector in which a small light modulation device for forming an optical image in accordance with image information is illuminated with light from a light source apparatus and the optical image is enlarged and displayed through a projection lens on a screen or any other suitable surface.

In recent years, it has been increasingly desired to reduce the size of a projector so that, for example, an enlarged image can be displayed in unspecified locations. To achieve the size reduction, reduction of the size of each member used in a projector has been underway in a variety of forms, and as one of them, an illuminator that can be reduced in size without significant reduction in the amount of output light has been studied. JP-A-2003-16802 proposes an example of the technology described above.

JP-A-2003-16802 proposes an illuminator including halved primary and secondary reflection mirrors. That is, a typical reflection mirror having a reflection surface entirely surrounding an arc tube is cut in half along a plane parallel to the optical axis, whereby the size of the light source apparatus is reduced. On the other hand, a small secondary reflection mirror that reflects the light that is emitted from the arc tube but is not directly incident on the halved reflection mirror (primary reflection mirror) toward the primary reflection mirror is provided, whereby the light source apparatus is reduced in size while the amount of output light is maintained.

The technology described in JP-A-2003-16802 allows the light source apparatus to be reduced in size with the amount of light maintained, whereby a projector using the light source apparatus can be significantly reduced in size. The technology, however, still needs to be improved from the viewpoint of forming an excellent image by using the output light.

That is, in the illuminator described in JP-A-2003-16802, the primary reflection mirror has an asymmetric shape obtained by halving a typical primary reflection mirror entirely surrounding an arc tube. As a result, the illuminance distribution of the light reflected off the primary reflection mirror has non-uniformity in which the illuminance on the side far away from the arc tube is low, whereas the illuminance on the side close to the arc tube is high, which could result in brightness unevenness in which one end of an object to be illuminated is dark, whereas the other end thereof is bright.

When the illuminator described above is incorporated in a projector, a resultant projected image also suffers from brightness unevenness and decrease in image quality. In particular, in a three-panel projector in which the light from an illuminator is separated into red (R), green (G), and blue (B) three color light fluxes, which are modulated by light modulation devices to form image light, which is then projected and displayed, it is conceivable to transmit one of the three color light fluxes through a relay optical system to the corresponding light modulation device (object to be illuminated), such as a liquid crystal panel. In this configuration, since an image formed by the light modulation device illuminated with the light having passed through the relay optical system is reversed with respect to the images formed by the other two light modulation devices, the brightness unevenness described above results in color unevenness and hence a decrease in display quality.

SUMMARY

An advantage of some aspects of the invention is to provide a projector capable of displaying an image with brightness unevenness or color unevenness suppressed even when the illuminance distribution of the light emitted from a light source has an asymmetric shape.

A projector according to an aspect of the invention includes a light source that emits light having an asymmetric illuminance distribution, a light modulation device that modulates the light emitted from the light source, and an optical member disposed in an optical path between the light source and the light modulation device, the optical member changing the illuminance distribution of the light from the light source. The optical member changes the illuminance distribution of the light passing therethrough in such a way that a highest illuminance area in the illuminance distribution of the light after passing through the optical member is shifted toward the center of the optical member as compared with the position of the highest illuminance area in the illuminance distribution of the light before incident on the optical member.

The "asymmetric illuminance distribution" used herein is an illuminance distribution that is in a plane perpendicular to the central axis of the light emitted from the light source but is not axially symmetric with respect to an axis passing through the central axis.

According to the configuration described above, the asymmetric illuminance distribution can be corrected to an almost symmetric distribution by using the optical member to control the illuminance distribution of the light emitted from the light source. The optical member capable of controlling an illuminance distribution may, for example, have a configuration in which the light from a high illuminance area is attenuated so that a low illuminance area becomes a relatively high illuminance area or a configuration in which light is refracted or diffracted to shift the position illuminated with the light so that the position of a high illuminance area is changed. Providing the optical member allows a uniform illuminance distribution to be achieved on an object to be illuminated even when the illuminance distribution of the light emitted from the light source has an asymmetric shape.

In the aspect of the invention, the light source can include an arc tube having a pair of electrodes, a first reflection mirror that extends along part of the entire circumference around an optical axis of the arc tube and reflects the light emitted from the arc tube toward an object to be illuminated, and a second reflection mirror that faces the first reflection mirror with the optical axis of the arc tube therebetween and reflects the light emitted from the arc tube toward the first reflection mirror.

According to the configuration described above, part of the light radiated from the arc tube is reflected off the first reflection mirror and exits therefrom, whereas the remaining portion of the light is reflected off the second reflection mirror, passes through the arc tube, is reflected off the first reflection mirror, and exits therefrom along with the light emitted from the arc tube and directly incident on the first reflection mirror. When the reflection mirrors are designed in such a way that the light radiated from the arc tube toward the second reflection mirror is reflected off the second reflection mirror and a large proportion of the light returns to the first reflection mirror, the amount of output light will not significantly decrease. Further, since each of the first and second reflection mirrors is part of a concave reflection mirror of related art, the size of the light source can be significantly reduced as compared with that in related art.

In the aspect of the invention, the optical member desirably controls the illuminance distribution of the light passing therethrough in such a way that a high illuminance area in the illuminance distribution of the light incident on the optical member is shifted toward the center of an area to be illuminated.

According to the configuration described above, brightness unevenness at the center of an image formed by the projector can be reliably suppressed. Since a user of the projector considers the center of an image displayed by the projector as the center of the field of view and observes the projected image, the image can be displayed in a satisfactory manner by suppressing the brightness unevenness at the center of the image in the first place.

In the aspect of the invention, the projector further desirably includes a color separation optical system that separates the light emitted from the light source into a plurality of color light fluxes, a light combining optical system that combines the plurality of color light fluxes having exited from the light modulation device, which is formed of a plurality of light modulation devices, and a relay optical system that reverses only a specific one of the plurality of color light fluxes and directs the reversed color light flux toward the light combining optical system. The optical member is desirably disposed in an optical path along which the specific color light flux propagates.

Since an image formed by the light modulation device illuminated with the color light flux having passed through the relay optical system is reversed with respect to the images formed by the other two light modulation devices, a high illuminance area of the color light flux that has passed through the relay optical system is superimposed on low illuminance areas of the color light fluxes that have not passed through the relay optical system and vice versa. As a result, brightness unevenness and hence color unevenness occur, and display quality decreases accordingly. The configuration described above, however, reduces the degree of brightness unevenness of the reversed color light flux, whereby the difference in illuminance among the plurality of color light fluxes superimposed in an image decreases. As a result, when the color light fluxes are superimposed, the brightness unevenness unlikely causes color unevenness, whereby an image can be displayed in a satisfactory manner.

In the aspect of the invention, the optical member is desirably a relay lens that is part of the relay optical system, and the relay lens is desirably disposed in such a way that a lens optical axis of the relay lens deviates from the central axis of the optical path of the color light flux passing through the relay optical system so that a high illuminance area in the illuminance distribution of the color light flux that has passed through the relay optical system is shifted toward high illuminance areas in the illuminance distributions of the other color light fluxes that have not passed through the relay optical system.

According to the configuration described above, when a color light flux passes through the relay optical system, the position illuminated with the color light flux is shifted from the central axis of the optical path thereof, and the position of the high illuminance area thereof can therefore be changed. As a result, the degree of the brightness unevenness due to the color light flux reversed by the relay optical system can be sufficiently reduced.

In the aspect of the invention, the optical member may be a relay lens that is part of the relay optical system, and the relay lens may be decentered so that a high illuminance area in the illuminance distribution of the color light flux that has passed through the relay optical system is shifted toward high illuminance areas in the illuminance distributions of the other color light fluxes that have not passed through the relay optical system.

According to the configuration described above, using an aberration of a lens induced by decentering the lens with the arrangement of the relay optical system being the same as that of a typical relay optical system allows the position illuminated with the color light flux to be shifted from the central axis of the optical path thereof, and the position of the high illuminance area thereof can therefore be changed. As a result, the degree of the brightness unevenness due to the color light flux reversed by the relay optical system can be sufficiently reduced.

In the aspect of the invention, the light having passed through the optical member is desirably incident on the light modulation device without passing through any other optical system.

For example, if any other optical system is interposed between the optical member and the light modulation device, it is necessary to design the illuminance distribution of the light having passed through the optical member in consideration of the fact that the illuminance distribution formed when the light passes through the optical member changes because the light further passes through the other optical system. In contrast, when the optical member is disposed immediately in front of the light modulation device, the light having the illuminance distribution controlled by the optical member is immediately incident on the light modulation device, whereby an illuminance distribution suitable for displaying an image with the degree of color unevenness reduced is readily designed.

In the aspect of the invention, a fly's eye integrator or a rod integrator is desirably disposed in an optical path between the light source and the optical member.

A fly's eye integrator and a rod integrator may not completely solve brightness unevenness due to an asymmetric illuminance distribution but can reduce the degree of the brightness unevenness. Therefore, brightness unevenness of the light having passed through the optical member can be more reliably suppressed by reducing the degree of brightness unevenness in advance before the light is incident on the optical member.

In the aspect of the invention, the projector desirably further includes a fly's eye integrator disposed in an optical path between the light source and the optical member and a light superimposing optical system having a spherical aberration disposed in an optical path between the fly's eye integrator and the light modulation device.

When the light superimposing optical system has a spherical aberration, the portion of the light incident on the fly's eye integrator that has low illuminance is not incident on the light modulation device. Further, since an image formed on the light modulation device is blurred, the degree of brightness unevenness on the light modulation device is reduced. Therefore, when the color light fluxes are superimposed via the light modulation device, the brightness unevenness unlikely results in color unevenness, whereby an image can be display in a satisfactory manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to FIGS. 1 to 4. In all the following drawings, the dimension, the scale, and other factors of each component are changed as appropriate for clarity.

Figure 1:
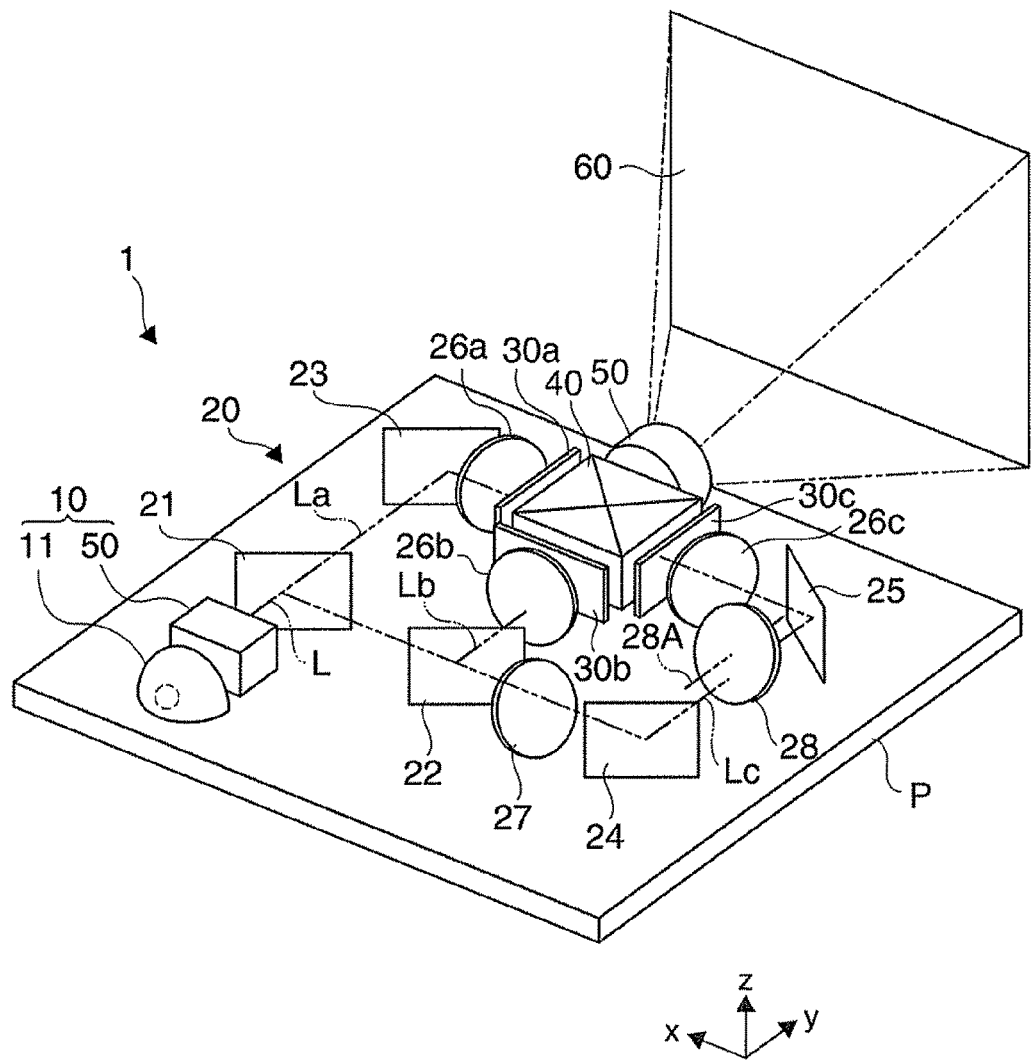
FIG. 1 diagrammatically shows a projector according to an embodiment of the invention.

FIG. 1 diagrammatically shows the projector of the present embodiment. As shown in FIG. 1, the projector 1 includes an illumination system 10, a color separation optical system 20, liquid crystal light valves (light modulation devices) 30a to 30c, a light combining element (light combining optical system) 40, and a projection optical system 50 on a substrate P.

In the following description, an XYZ orthogonal coordinate system is set as shown in FIG. 1, and the positional relationship among members is described based on the thus set coordinate system in some cases. In the XYZ, orthogonal coordinate system, let an X-axis direction be the direction parallel to the optical axis of light L having exited from the illumination system 10, a Y-axis direction be the direction perpendicular to the X axis and parallel to the front surface of the substrate P, and a Z-axis direction be not only the direction perpendicular to the X axis but also the direction of a normal to the substrate P.

The projector 1 generally operates as follows: The light having exited from the illumination system 10 is separated into a plurality of color light fluxes in the color separation optical system 20. The plurality of color light fluxes separated in the color separation system 20 are incident on the respective liquid crystal light valves 30a to 30c and modulated therein.

The plurality of color light fluxes modulated in the liquid crystal light valves 30a to 30c are incident on the light combining element 40 and combined therein. The light combined in the light combining element 40 is enlarged and projected through the projection optical system 50 on a projection surface 60, such as a wall and a screen. A full color projected image is thus displayed. Each of the components in the projector 1 will be described below.

Figure 2:
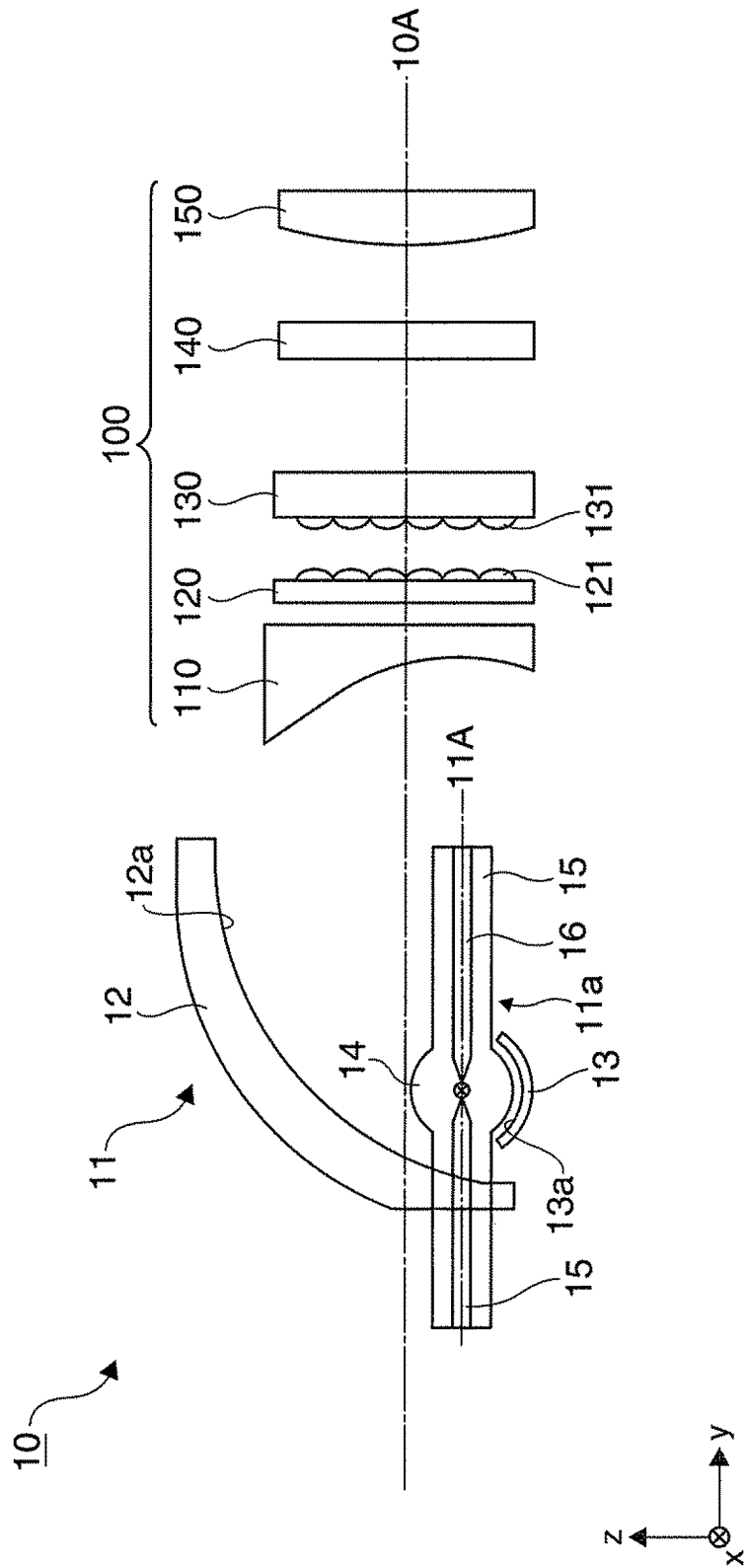
FIG. 2 is a schematic cross-sectional view showing an illumination system of the projector of the present embodiment.

FIG. 2 is a cross-sectional view showing a schematic configuration of the illumination system 10. As shown in FIG. 2, the illumination system 10 includes a light source apparatus (light source) 11 and an illumination optical system 100. The components of the illumination optical system 100 are arranged along an optical axis 10A of the illumination system 10. The optical axis 10A substantially coincides with the central axis of the light emitted from the light source apparatus 11. The illumination optical system 100 has a parallelizing lens 110, lens arrays 120 and 130, polarization conversion element 140, and a superimposing lens 150 disposed in this order in the direction from the light source apparatus 11 toward the downstream side of the optical axis 10A.

The light source apparatus 11 includes an arc discharge tube (hereinafter also simply referred to as an "arc tube") 11a, a primary reflector (first reflection mirror) 12, and a secondary reflector (second reflection mirror) 13. The primary reflector 12 and the secondary reflector 13 have respective concave reflection surfaces and are disposed in such a way that the respective reflection surfaces face each other.

The arc tube 11a is disposed in a region surrounded by the primary reflector 12 and the secondary reflector 13. The arc tube 11a generally extends along a light source axis (hereinafter referred to as a lamp axis) 11A and has a shape substantially axially symmetric around the lamp axis 11A. The optical axis of the light source apparatus 11 is substantially parallel to the lamp axis 11A.

The arc tube 11a includes a valve 14, sealing portions 15, and feeding terminals 16. The valve 14 is a hollow, substantially spherical member having an internal space, and the sealing portions 15, each of which has a rod-like shape, are integrated with the respective ends of the valve 14. The valve 14 and the sealing portions are made of a transparent, highly heat-resistant material, such as quartz glass and sapphire.

The feeding terminals 16, each of which has a rod-like shape, are buried in and through the sealing portions 15 on both ends, and the ends of the feeding terminals serve as a pair of electrodes facing each other in the internal space of the valve 14. A light emitting substance and a gas are sealed in the internal space of the valve 14. Examples of the light emitting substance include mercury and a metallic halide compound, and examples of the gas include a rare gas and a halogen gas. In the present embodiment, the arc tube 11a is fixed to the primary reflector 12 and oriented in such a way that the direction in which the feeding terminals 16 extend coincides with the lamp axis 11A.

Examples of the arc tube 11a include a high-pressure mercury lamp, a metal halide lamp, and a xenon lamp.

Each of the primary reflector 12 and the secondary reflector 13 is formed of a base made of a material having high heat resistance and high mechanical strength, such as glass and crystallized glass, and a reflection mirror formed of a dielectric multilayer film, a metal film, or any other suitable film formed over the entire area of the inner surface (the surface facing the arc tube) of the base.

The primary reflector 12 reflects the light emitted from the arc tube 11a toward an object to be illuminated and causes the light to travel generally along the optical axis 10A. The inner surface of the primary reflector 12 that faces the arc tube 11a is a reflection surface 12a formed of the reflection mirror.

The secondary reflector 13 has a primary function of reflecting the light emitted from the arc tube 11a toward the primary reflector 12 and is formed of a reflection mirror having a spherically concave reflection surface.

The parallelizing lens 110 is formed of a concave lens and parallelizes the light emitted from the light source apparatus 11.

The lens arrays (fly's eye integrators) 120 and 130 make the luminance distribution of the light having exited through the parallelizing lens 110 uniform. The lens array 120 includes a plurality of lenses 121, and the lens array 130 includes a plurality of lenses 131. The lenses 121 correspond to the lenses 131 in a one-to-one relationship. The light having exited through the parallelizing lens 110 is spatially divided and incident on the plurality of lenses 121. Each of the lenses 121 focuses the incident light on the corresponding lens 131. In this way, a secondary light source image is formed on each of the plurality of lenses 131.

The polarization conversion element 140 aligns the polarization directions of the light fluxes L having exited through the lens arrays 120 and 130. The polarization conversion element 140 includes a plurality of polarization conversion cells corresponding to the lenses 131 in a one-to-one relationship. The light incident on the polarization conversion cells and passing therethrough is converted into P-polarized or S-polarized light and exits therefrom.

The superimposing lens 150 superimposes the light fluxes having exited from the polarization conversion element 140 on an area to be illuminated. The light emitted from the light source apparatus 11 is spatially divided into light fluxes, which are then superimposed, whereby the luminance distribution is made uniform and the degree of axial symmetry around the optical axis 10A is enhanced.

In the light source apparatus 11 in the thus configured illumination system 10, the primary reflector is asymmetric in the Z-axis direction because it is obtained by halving a typical reflector entirely surrounding the arc tube 11a. As a result, the illuminance distribution of the light reflected off the primary reflector 12 is an asymmetric illuminance distribution in which the illuminance is low on the side far away from the arc tube 11a (+Z side), whereas the illuminance is high on the side close to the arc tube 11a (−Z side).

Referring back to FIG. 1, the color separation optical system 20 includes dichroic mirrors 21 and 22, mirrors 23 to 25, field lenses 26a to 26c, relay lenses (relay optical system) 27 and 28. Each of the dichroic mirrors 21 and 22 is obtained, for example, by laminating a dielectric multilayer film on a surface of a glass plate. Each of the dichroic mirrors 21 and 22 selectively reflects color light having a predetermined wavelength band and transmits color light having the remaining wavelength band. In the present embodiment, the dichroic mirror 21 reflects green light and blue light, and the dichroic mirror 22 reflects green light.

The light L having exited from the illumination system 10 is incident on the dichroic mirror 21. Red light La of the light L passes through the dichroic mirror 21 and impinges on the mirror 23, which reflects the red light La toward the field lens 26a. The red light La is parallelized by the field lens 26a and then incident on the liquid crystal light valve 30a.

The green light Lb and the blue light Lc of the light L is reflected off the dichroic mirror 21 and incident on the dichroic mirror 22. The green light Lb is reflected off the dichroic mirror 22 and incident on the field lens 26b. The green light Lb is parallelized by the field lens 26b and then incident on the liquid crystal light valve 30b.

The blue light Lc having passed through the dichroic mirror 22 passes through the relay lens 27, is reflected off the mirror 24, passes through the relay lens 28, is reflected off the mirror 25, and is incident on the field lens 26c. The blue light Lc is parallelized by the field lens 26c and then incident on the liquid crystal light valve 30c.

Each of the liquid crystal light valves 30a to 30c is formed of a light modulator, such as transmissive liquid crystal light valve. The liquid crystal light valves 30a to 30c are electrically connected to a PC or any other suitable signal source (not shown) that supplies image signals containing image information. The liquid crystal light valves 30a to 30c modulate the light incident thereon on a pixel basis in accordance with the supplied image signals to form images. The liquid crystal light valves 30a to 30c form a red image, a green image, and a blue image, respectively. The light fluxes (images) modulated (formed) by the liquid crystal light valves 30a to 30c are incident on the light combining element 40.

The light combining element 40 is formed, for example, of a dichroic prism. The dichroic prism in the present embodiment has a structure in which four triangular prisms are bonded to each other. The interface between adjacent triangular prisms bonded to each other forms an internal surface of the dichroic prism. The internal surfaces of the dichroic prism form two mirror surfaces perpendicular to each other, one of them reflecting the red light and transmitting the green light and the other reflecting the blue light and transmitting the green light. The green light incident on the dichroic prism passes through the mirror surfaces and exits straight through the dichroic prism. The red and blue light incident on the dichroic prism is selectively reflected off or passes through the mirror surfaces and exits through the dichroic prism in the same direction in which the green light exits. The three color light fluxes (images) are thus superimposed and combined, and the combined color light is enlarged and projected through the projection optical system 50 on the projection surface 60.

The projector 1 of the present embodiment is basically configured as described above.

Consider now how the red light La, the green light Lb, and the blue light Lc behave. The red light La is reflected off the mirror 23 and the green light Lb is reflected off the dichroic mirror 22 before incident on the respective liquid crystal light valves, whereas the blue light Lc is reflected off the mirrors 24 and 25 and passes through the relay lenses 27 and 28 before incident on the corresponding liquid crystal light valve. When the blue light Lc passes through the relay lenses 27 and 28, the illuminance distribution of the blue light Lc is reversed. As a result, only the blue light Lc has a reversed illuminance distribution with respect to those of the red light La and the green light Lb.

To reduce the degree of the difference in illuminance distribution described above, the arrangement of the relay lens 28 in the projector 1 differs from that of a typical relay lens. That is, the position of the relay lens 28 is shifted in the +Z direction so that a lens optical axis 28A of the relay lens 28 deviates from the center of the optical path of the blue light Lc indicated by the double dashed line in FIG. 1.

How much the thus shifted relay lens 28 reduces the degree of color unevenness has been checked in a simulation. In the simulation, an imaginary image is formed by superimposing the color light fluxes incident on the liquid crystal light valves 30a to 30c, and a plurality of points in the imaginary image is considered. The chromaticity at each of the points is calculated from the RGB luminance values thereof, and the difference in chromaticity between every pair of the plurality of points is determined to find the largest difference in chromaticity. The simulation has indicated that different shifted arrangements of the relay lens 28 provide different largest differences in chromaticity.

Figure 3:
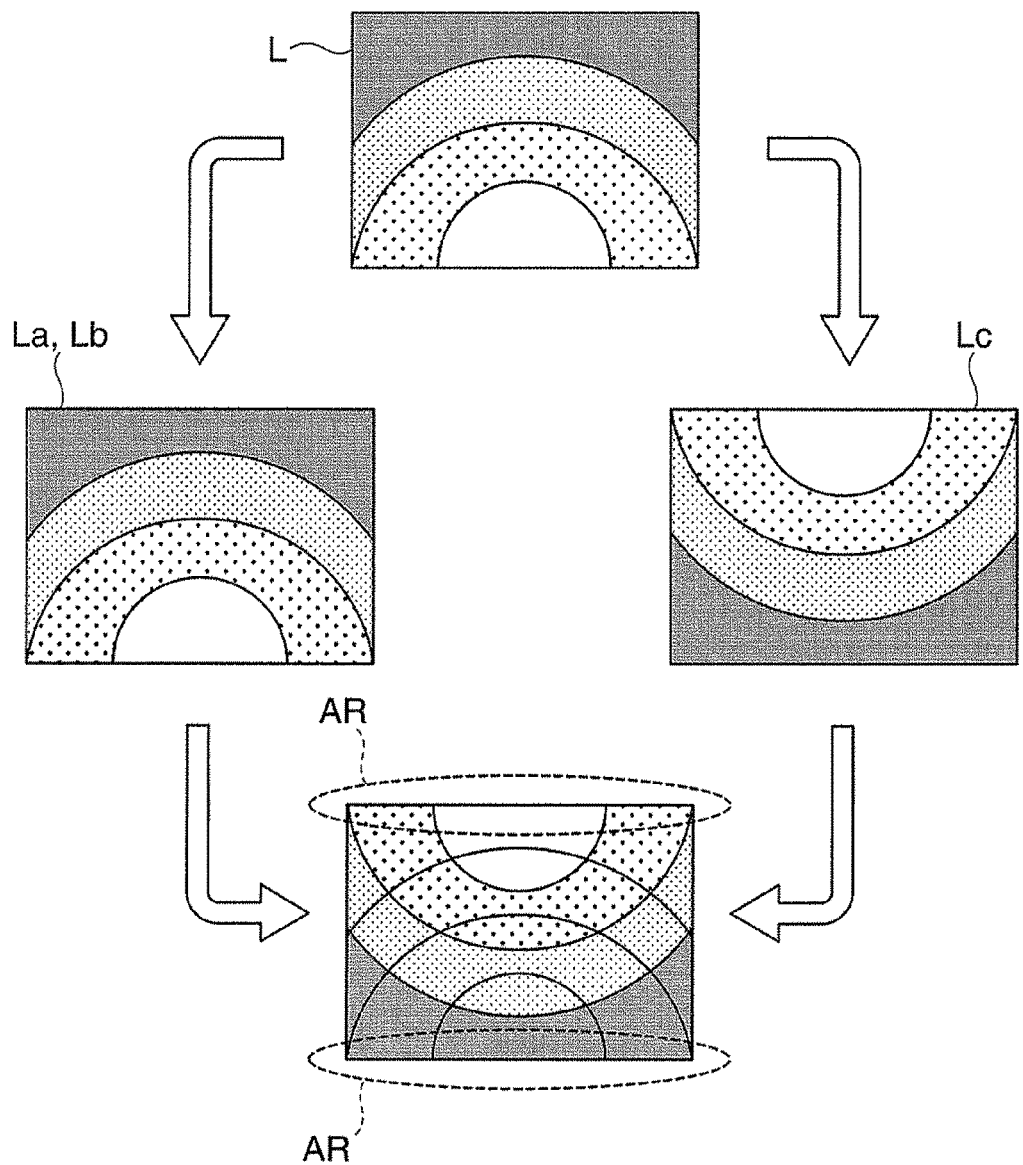
FIG. 3 describes Comparative Example.
Figure 4:
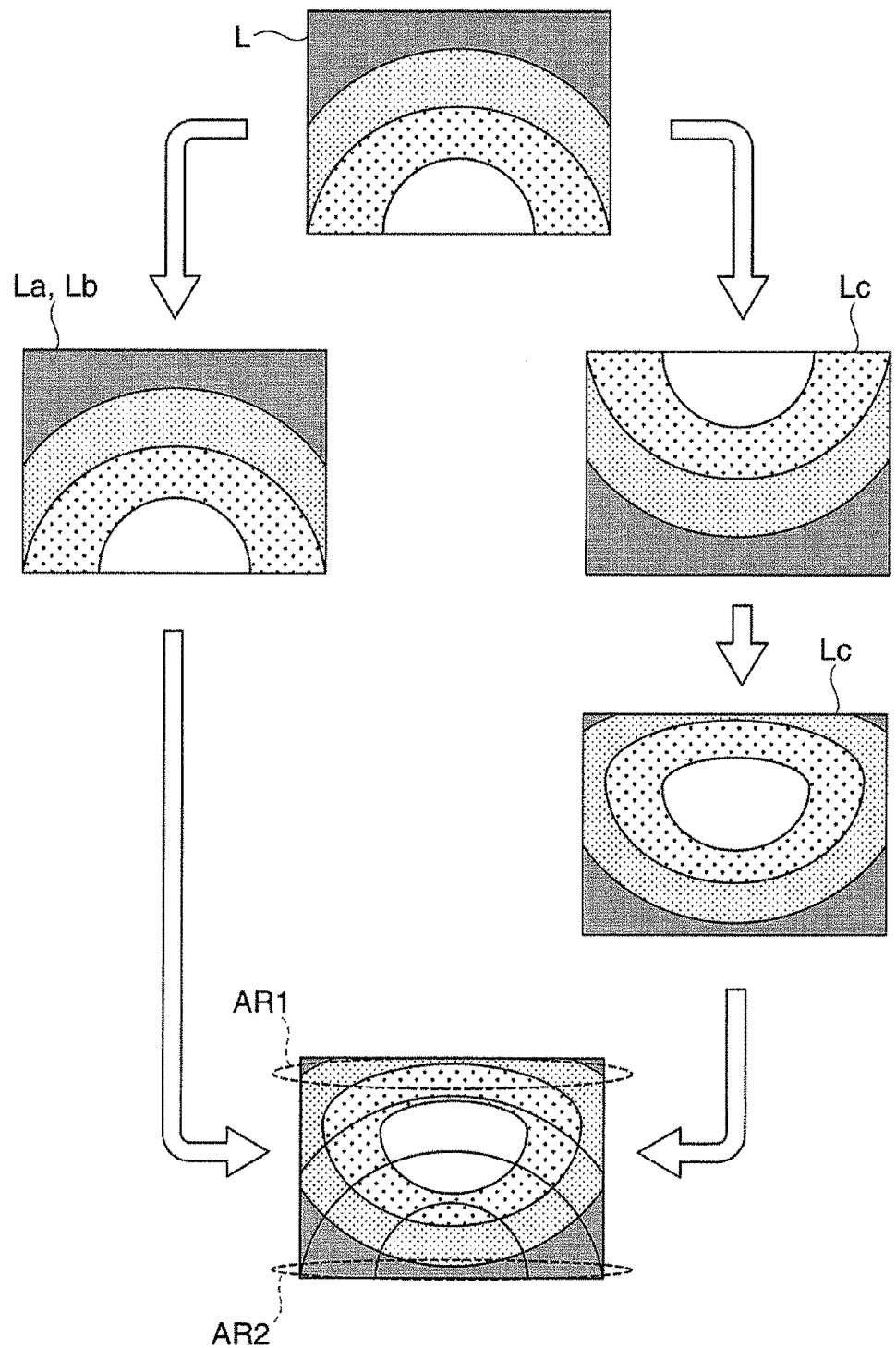
FIG. 4 describes an advantageous effect of the invention.

FIGS. 3 and 4 describe an advantageous effect of the invention and schematically show results of the simulation described above. FIG. 3 shows color unevenness in a projected image in Comparative Example (typical arrangement) in which the lens optical axis 28A of the relay lens 28 coincides with the center of the optical path of the blue light Lc, and FIG. 4 shows color unevenness in a projected image in the present embodiment in which the relay lens 28 is shifted. In each image in FIGS. 3 and 4, the upper side corresponds to the +Z direction in FIGS. 1 and 2, and the lower side corresponds to the −Z direction in FIGS. 1 and 2.

First, in an imaginary plane perpendicular to the central axis of the optical path, the light L has an asymmetric illuminance distribution in which the illuminance on the +Z side is low whereas the illuminance on the −Z side is high, as shown in FIG. 3. In FIG. 3, a darker area corresponds to lower illuminance, whereas a brighter area corresponds to higher illuminance.

The light L is then separated by the dichroic mirrors into the red light La, the green light Lb, and the blue light Lc. Further, the blue light Lc, which is reversed when passing through the relay lenses, has brightness unevenness (color unevenness) in which the illuminance on the +Z side is high and the illuminance on the −Z side is low, as shown in FIG. 3.

As shown in FIG. 3, when the relay lens 28 is disposed in a typical position and the red light La, the green light Lb, and the blue light Lc are superimposed, the red light La and the green light Lb are superimposed in such a way that the bright areas are superimposed with each other and the dark areas are superimposed with each other, whereby neither of the two colors will be emphasized but the two colors are mixed in a satisfactory manner. When the blue light Lc is superimposed on the red light La and the green light Lb, however, the bright area of the red/green light is superimposed on the dark area of the blue light and vice versa in the areas labeled with reference character AR in FIG. 3. As a result, the color of the light having higher illuminance is emphasized, which does not produce white light but produce color unevenness.

In contrast, when the relay lens 28 is shifted as shown in FIG. 1, the position where the light is focused is shifted in the Z-axis direction, and the brightness unevenness of the blue light Lc changes accordingly, as shown in FIG. 4. As a result, the bright area of the blue light Lc is shifted toward the center in the image plane, that is, approaches the bright areas of the red light La and the green light Lb, whereas the periphery on the +Z side becomes darker.

When the blue light Lc having the brightness unevenness described above is superimposed on the red light La and the green light Lb, the decrease in brightness of the area of the blue light Lc that is superimposed on the dark areas of the red light La and the green light Lb reduces the difference in brightness between the blue light and the red/green light in the area labeled with reference character AR1 in FIG. 4, as compared with the difference in brightness in the state shown in FIG. 3. Further, the decrease in the dark area of the blue light Lc that is superimposed on the bright areas of the red light La and the green light Lb reduces the difference in brightness between the blue light and the red/green light in the area labeled with reference character AR2 in FIG. 4, as compared with the difference in brightness in the state shown in FIG. 3. The shifted relay lens 28 therefore reduces the largest difference in chromaticity described above and the degree of the color unevenness accordingly. Therefore, an image with color unevenness suppressed can be displayed by using the color light fluxes described above.

As described above, in the three-panel projector capable of displaying a full-color image, since an image formed by the liquid crystal light valve for blue light, on which light is incident via the relay optical system, is reversed with respect to images formed by the other liquid crystal light valves, color unevenness could occur when the illuminator emits light having an asymmetric illuminance distribution. According to the projector 1 of the present embodiment, however, shifting one of the relay lenses provided in the optical path of the blue light allows the bright portion of the blue light, with which the liquid crystal light valve 30c is illuminated, to approach the bright portions of the light with which the other liquid crystal light valves 30a and 30b is illuminated, whereby a small projector capable of displaying an image with color unevenness and brightness unevenness suppressed is achieved.

In the present embodiment, the brightness unevenness (illuminance distribution) of the blue light Lc is controlled by shifting the position of the relay lens 28 to shift the position where the light is focused. Alternatively, the position where the light is focused may be shifted from the center of the optical path of the blue light Lc by changing the curvature of the relay lens from those of the other lenses and decentering the relay lens 28.

In the present embodiment, the color unevenness is controlled by using the relay lens 28, but the relay lens 28 is not necessarily used for the purpose. A dedicated optical member for controlling the color unevenness of the blue light Lc may alternatively be disposed in the optical path of the blue light Lc. The optical member may be any optical component that can control the illuminance distribution of the light passing therethrough in such a way that the portion of the illuminance distribution that is close to the bright areas of the red light La and the green light Lb is a bright area. For example, a light attenuation filter, a CGH, a diffuser, or any other suitable component that allows the area illuminated with the light passing therethrough to have a brightness distribution in which a central portion is brighter than the periphery.

The optical member is desirably disposed immediately in front of the corresponding liquid crystal light valve, whereby the light having passed through the optical member is incident on the liquid crystal light valve without passing through any other optical system. If any other optical system is interposed between the optical member and the liquid crystal light valve, it is necessary to design the illuminance distribution of the light having passed through the optical member in consideration of the fact that the illuminance distribution formed when the light passes through the optical member changes because the light further passes through the other optical system. In contrast, when the optical member is disposed immediately in front of the liquid crystal light valve, it is not necessary to consider the presence of the other optical system, and an illuminance distribution suitable for displaying an image with the degree of color unevenness reduced is readily designed.

In the present embodiment, the color unevenness is controlled by using the relay lens 28. Alternatively, the color unevenness may be controlled by using the relay lens 27 or the field lens 26c.

The present embodiment has been described with reference to the case where the blue light Lc differs from the red light La and the green light Lb in terms of illuminance distribution and hence color unevenness occurs because the relay lenses are disposed in the optical path of the blue light Lc. The problem is not limited to the blue light Lc. The same problem, of course, occurs if relay lenses are disposed in the optical path of the red light La because the illuminance distribution of the red light differs from those of the other color light fluxes. Similarly, if relay lenses are disposed in the optical path of the green light Lb, the illuminance distribution of the green light differs from those of the other color light fluxes.

In the present embodiment, the lens arrays 120 and 130, each of which is a fly's eye integrator, are used. Alternatively, a rod integrator may be used. Still alternatively, the degree of color unevenness can be reduced only by using the relay lens 28 even when any integrator described above is not used.

The advantage of the present embodiment is to solve color unevenness due to the illuminance distribution of the light emitted from the light source apparatus 11 having a halved reflector. The light source apparatus does not necessarily have a halved reflector, and the invention can be used to solve color unevenness produced by other light source apparatus that emits light having an asymmetric illuminance distribution.

In the present embodiment, a transmissive liquid crystal light valve is used as a light modulation device. Alternatively, a reflective liquid crystal light valve or a digital mirror device can be used. In this case, the optical system disposed between the light source apparatus and the image formation apparatus, the optical system disposed between the image formation apparatus and the projection optical system, the projection optical system, or other optical systems may be changed as appropriate in accordance with the type of the image formation apparatus.

Variations

Besides the configuration of the present embodiment, the color unevenness may be controlled by using an optical system formed of a combination of a plurality of lenses (relay optical system, for example). In general, an optical system is designed in such a way that aberrations are removed by combining a plurality of lenses. In the invention, however, unlike the typical design, the degree of color unevenness can be reduced by intentionally forming aberrations by combining a plurality of lenses.

Figure 5:
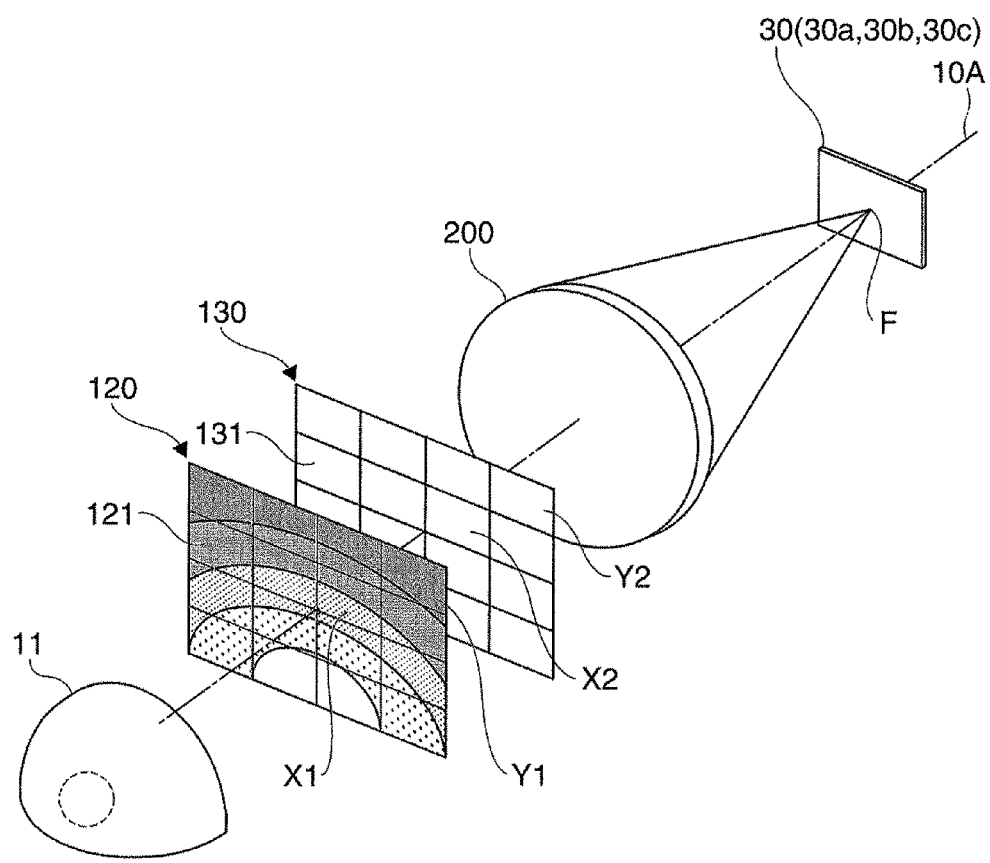
FIG. 5 diagrammatically shows a variation of the projector according the embodiment of the invention.

FIG. 5 diagrammatically shows the behavior of the light emitted from the light source apparatus 11. To simplify the description, FIG. 5 shows the lens arrays 120 and 130 and the liquid crystal light valves 30 are arranged along the optical axis 10A of the light source apparatus 11, and reference character 200 denotes a light superimposing optical system formed of the superimposing lens 150, the relay optical system, the field lenses, and other optical components disposed between the lens array 130 and the liquid crystal light valves 30. In FIG. 5, the lens array 120 is divided into 16 lenses 121, and the lens array 130 is also divided into 16 lenses 131.

The light emitted from the light source apparatus 11 first has an illuminance distribution in which the illuminance in a lower central portion is high and the illuminance decreases with distance therefrom. FIG. 5 shows the illuminance distribution of the light with which the lens array 120 is illuminated by using grayscales as in FIGS. 3 and 4.

The illuminance of the light incident on the plurality of lenses 121 in the lens array 120 differs from each other in accordance with the illuminance distribution (reference characters x1 and Y1, for example), and secondary light source images having different illuminance are formed on the lenses 131 (reference characters X2 and Y2, for example) corresponding to the lenses 121.

The light fluxes having passed through the lens array 130 are superimposed on the liquid crystal light valves 30, which are the areas to be illuminated, by the light superimposing optical system 200. In typical design, the focal position of the light superimposing optical system 200 coincides with the liquid crystal light valves 30. In FIG. 5, the focal point F of the light superimposing optical system 200 coincides with the liquid crystal light valves 30. In this way, the secondary light source images having different illuminance formed on the lens array 130 are superimposed on the liquid crystal light valves 30, which are illuminated with the superimposed light.

Consider now a case where the light superimposing optical system 200 is designed to intentionally contain an aberration that causes the focal position thereof not to be fixed but distributed along the optical axis 10A, that is, a spherical aberration. The following advantageous effect is then provided.

Figure 6A:
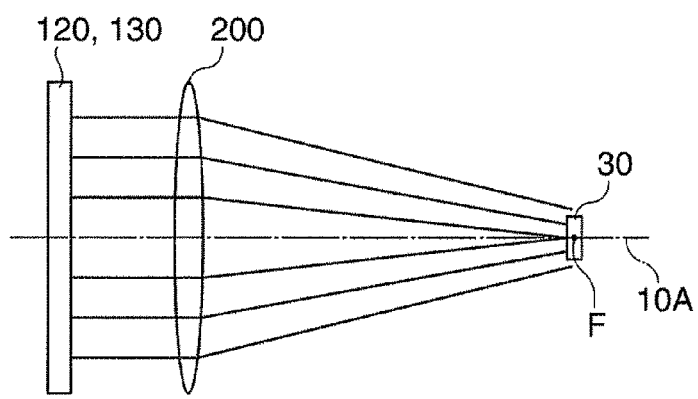
FIGS. 6A to 6D diagrammatically show the variation of the projector according the embodiment of the invention.

For example, consider a case where the light superimposing optical system 200 has a spherical aberration that causes the focal position thereof to be shifted away from the nominal position in the negative direction with distance from the optical axis 10A, as shown in FIG. 6A. The spherical aberration of the light superimposing optical system 200 can be designed as appropriate by replacing part of the lenses that form the light superimposing optical system 200, which has been originally designed to focus the light passing therethrough on the liquid crystal light valves 30, with an aspheric lens or inserting a concave lens between adjacent lenses that are part of the light superimposing optical system 200.

In this case, since the liquid crystal light valves 30 are not disposed in the nominal position where the light fluxes divided by the lens arrays 120 and 130 are intended to be focused, the light fluxes with which the liquid crystal light valves 30 are illuminated are spread more than necessary to illuminate the liquid crystal light valves 30. As a result, parts of the illuminating light fluxes are superimposed on the liquid crystal light valves 30, but the proportion of the light that misses the liquid crystal light valves 30 increases.

Figure 6B:
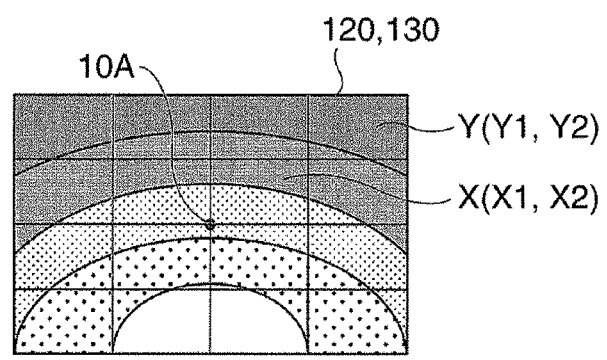
Figure 6C:
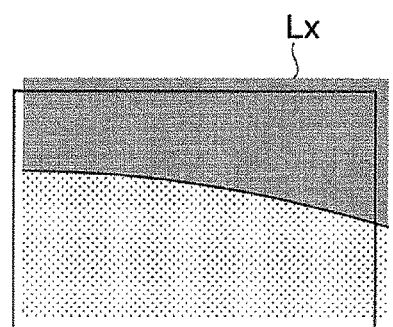

After the lens arrays 120 and 130 divide the light emitted from the light source apparatus 11 and having the illuminance distribution shown in FIG. 6B, the light fluxes passing through the lenses indicated by reference character X, which are located close to the optical axis 10A, are not greatly affected by the aberration or deviate from the intended position and most of the light fluxes are incident on the liquid crystal light valves 30, whereas parts of the peripheral portions of the light fluxes that are located away from the optical axis 10A are not incident on the liquid crystal light valves 30 (FIG. 6C).

Figure 6D:
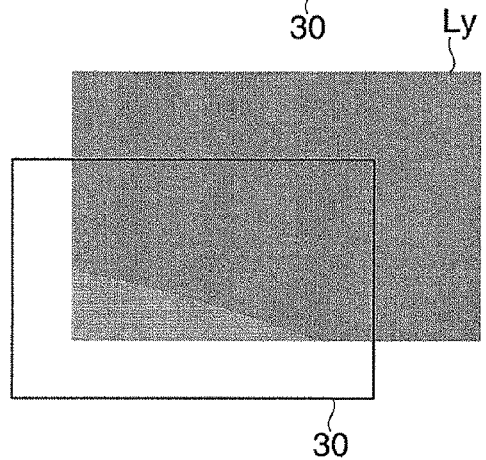

On the other hand, the light fluxes passing through the lenses indicated by reference character Y in FIG. 6B, which are located away from the optical axis 10A, and directed toward the liquid crystal light valves are greatly affected by the aberration and deviate from the intended position, and much of the peripheral portions of the light fluxes that are located away from the optical axis 10A are not incident on the liquid crystal light valves 30 (FIG. 6D). That is, when the light fluxes are incident on the liquid crystal light valves 30, the portions of the light fluxes (dark areas) that cause brightness unevenness are removed and the remaining portions are superimposed on the liquid crystal light valves 30.

In addition, when the light superimposing optical system 200 has a spherical aberration, images formed on the liquid crystal light valves 30 are blurred because the light fluxes are not sharply focused on the liquid crystal light valves 30. As a result, the gradation of the brightness unevenness produced on the liquid crystal light valves 30 is not clear, and the degree of the brightness unevenness is reduced accordingly.

When the light superimposing optical system 200 has a spherical aberration, the two advantageous effects described above are combined, and the degree of the brightness unevenness on each of the liquid crystal light valves 30 (liquid crystal light valves 30a to 30c) decreases. The decrease is added to that obtained by shifting the position of the relay lens 28 described in the above embodiment, whereby an image with color unevenness further suppressed can be displayed.

The above description has been made with reference to the case where the light superimposing optical system 200 has a spherical aberration that causes the focal position thereof to be shifted in the negative direction, but the spherical aberration may cause the focal position to be shifted in the positive direction. In this case as well, the same advantageous effect is provided because the spherical aberration produces portions having low illuminance that are not incident on the liquid crystal light valves 30, and incident light fluxes are not sharply focused and images are blurred accordingly.

A preferred embodiment according to the invention has been described with reference to the accompanying drawings, but the invention is, of course, not limited thereto. The shapes, combinations, and other factors of the components shown in the embodiment described above have been presented by way of example, and they can be changed in a variety of ways based on design requests and other factors to the extent that they do not depart from the substance of the invention.

The entire disclosure of Japanese Patent Application Nos. 2009-235242, filed Oct. 9, 2009 and 2010-181294, filed Aug. 13, 2010 are expressly incorporated by reference herein.

What is claimed is:

1. A projector comprising:
a light source that emits light having an asymmetric illuminance distribution;
a light modulation device that modulates the light emitted from the light source; and
relay lenses that are disposed in an optical path between the light source and the light modulation device, the relay lenses changing the illuminance distribution of the light from the light source, wherein the relay lenses are configured in such a way that the relay lenses change the illuminance distribution of the light passing therethrough so that a highest illuminance area in the illuminance distribution of the light after passing through the relay lenses is shifted toward the center of the relay lenses as compared with the position of the highest illuminance area in the illuminance distribution of the light before incident on the relay lenses.

2. The projector according to claim 1, wherein the light source includes an arc tube having a pair of electrodes, a first reflection mirror that extends along part of the entire circumference around an optical axis of the arc tube and reflects the light emitted from the arc tube toward an object to be illuminated, and a second reflection mirror that faces the first reflection mirror with the optical axis of the arc tube therebetween and reflects the light emitted from the arc tube toward the first reflection mirror.

3. The projector according to claim 1, wherein the relay lenses control the illuminance distribution of the light passing therethrough in such a way that high illuminance area in the illuminance distribution of the light incident on the relay lenses is shifted toward the center of an area to be illuminated.

4. The projector according to claim 1, further comprising:
a color separation optical system that separates the light emitted from the light source into a plurality of color light fluxes; a light combining optical system that combines the plurality of color light fluxes having exited from the light modulation device, which is formed of a plurality of light modulation devices; and a relay optical system that reverses only a specific one of the plurality of color light fluxes and directs the reversed color light flux toward the light combining optical system, wherein the relay lenses are disposed in an optical path along which the specific color light flux propagates.

5. The projector according to claim 4, wherein the relay lenses are part of the relay optical system, and the relay lenses are disposed in such a way that a lens optical axis of the relay lenses deviates from the central axis of the optical path of the color Light flux passing through the relay optical system so that a high illuminance area in the illuminance distribution of the color light flux that has passed through the relay optical system is shifted toward high illuminance areas in the illuminance distributions of the other color light fluxes that have not passed through the relay optical system.

6. The projector according to claim 4, wherein the relay lenses are part of the relay optical system, and the relay lenses are decentered so that a high illuminance area in the illuminance distribution of the color light flux that has passed through the relay optical system is shifted toward high illuminance areas in the illuminance distributions of the other color light fluxes that have not passed through the relay optical system.

7. The projector according to claim 4, wherein the light having passed through the relay lenses is incident on the light modulation device without passing through any other optical system.

8. The projector according to claim 1, wherein a fly's eye integrator or a rod integrator is disposed in an optical path between the light source and the relay lenses.

9. The projector according to claim 1, further comprising:
a fly's eye integrator disposed in an optical path between the light source and the relay lenses; and a light superimposing optical system having a spherical aberration disposed in an optical path between the fly's eye integrator and the light modulation device.

10. A projector comprising:
a light source that emits light having an asymmetric illuminance distribution;
a light modulation device that modulates the light emitted from the light source;
an optical member disposed in an optical path between the light source and the light modulation device, the optical member changing the illuminance distribution of the light from the light source, wherein the optical member is configured to change the illuminance distribution of the light passing therethrough in such a way that a highest illuminance area in the illuminance distribution of the light after passing through the optical member is shifted toward the center of the optical member as compared with the position of the highest illuminance area in the illuminance distribution of the light before incident on the optical member; and
a color separation optical system that separates the light emitted from the light source into a plurality of color light fluxes; a light combining optical system that combines the plurality of color light fluxes having exited from the light modulation device, which is formed of a plurality of light modulation devices; and a relay optical system that reverses only a specific one of the plurality of color light fluxes and directs the reversed color light flux toward the light combining optical system, wherein the optical member is disposed in an optical path along which the specific color light flux propagates.

11. The projector according to claim 10, wherein the light source includes an arc tube having a pair of electrodes, a first reflection mirror that extends along part of the entire circumference around an optical axis of the arc tube and reflects the light emitted from the arc tube toward an object to be illuminated, and a second reflection mirror that faces the first reflection mirror with the optical axis of the arc tube therebetween and reflects the light emitted from the arc tube toward the first reflection mirror.

12. The projector according to claim 10, wherein the optical member controls the illuminance distribution of the light passing therethrough in such a way that high illuminance area in the illuminance distribution of the light incident on the optical member is shifted toward the center of an area to be illuminated.

13. The projector according to claim 10, wherein the optical member is a relay lens that is part of the relay optical system, and the relay lens is disposed in such a way that a lens optical axis of the relay lens deviates from the central axis of the optical path of the color light flux passing through the relay optical system so that a high illuminance area in the illuminance distribution of the color light flux that has passed through the relay optical system is shifted toward high illuminance areas in the illuminance distributions of the other color light fluxes that have not passed through the relay optical system.

14. The projector according to claim 10, wherein the optical member is a relay lens that is part of the relay optical system, and the relay lens is decentered so that a high illuminance area in the illuminance distribution of the color light flux that has passed through the relay optical system is shifted toward high illuminance areas in the illuminance distributions of the other color light fluxes that have not passed through the relay optical system.

15. The projector according to claim 10, wherein the light having passed through the optical member is incident on the light modulation device without passing through any other optical system.

16. The projector according to claim 10, wherein a fly's eye integrator or a rod integrator is disposed in an optical path between the light source and the optical member.

17. The projector according to claim 10, further comprising:
- a fly's eye integrator disposed in an optical path between the light source and the optical member; and a light superimposing optical system having a spherical aberration disposed in an optical path between the fly's eye integrator and the light modulation device.

\* \* \* \* \*